United States Patent
Bordone et al.

(10) Patent No.: US 6,737,495 B2
(45) Date of Patent: May 18, 2004

(54) METHOD FOR PREPARING POLYORGANOSILOXANES BY POLYMERIZATION CATALYZED BY A CATALYTIC SYSTEM BASED ON TRIFLIC ACID OR TRIFLIC ACID DERIVATIVES

(75) Inventors: Christian Bordone, Rillieux-la-Pape (FR); Jean-Roger Desmurs, Communay (FR); Léon Ghosez, Mont-Saint-Guibert (BE); José Martins, Rillieux (FR); Gérard Mignani, Lyons (FR)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 10/149,719

(22) PCT Filed: Dec. 14, 2000

(86) PCT No.: PCT/FR00/03518

§ 371 (c)(1),
(2), (4) Date: Oct. 2, 2002

(87) PCT Pub. No.: WO01/44349

PCT Pub. Date: Jun. 21, 2001

(65) Prior Publication Data

US 2003/0109659 A1 Jun. 12, 2003

(30) Foreign Application Priority Data

Dec. 17, 1999 (FR) .............................................. 99 16012

(51) Int. Cl.⁷ .............................................. C08G 77/08
(52) U.S. Cl. ........................................................ 528/23
(58) Field of Search ........................................ 528/23

(56) References Cited

U.S. PATENT DOCUMENTS

| | | | |
|---|---|---|---|
| 4,222,952 A | | 9/1980 | Vick |
| 4,448,927 A | | 5/1984 | Falender et al. |
| 5,223,595 A | | 6/1993 | Schoefberger et al. |
| 5,919,883 A | * | 7/1999 | Dittrich et al. ............... 528/15 |
| 6,294,634 B1 | * | 9/2001 | Ferritto et al. ................ 528/14 |

FOREIGN PATENT DOCUMENTS

| | | | | |
|---|---|---|---|---|
| EP | 0 031 063 | | 7/1981 | |
| EP | 0 065 925 | | 12/1982 | |
| FR | 2 303 040 | | 10/1976 | |
| JP | 03192126 A | * | 8/1991 | ........... C08G/77/04 |

OTHER PUBLICATIONS

"Studies on Supported Triflic Acid in Alkylation"; Angelis et al., Catalysis Today (2001), 65(2–4), 363–371.*

"Solid Superacid, Silica Supported Polytrifluoromethanesulfosiloxane Catalyzed Friedel Crafts Benzylation of Benzene and Substituted Benzenes", Zhou et al., Journal of Molecular Catalysis, Part A (2000).*

"Oxidative Amidation of Polyfluoroalkanesulfinic Acids"; Zhurnal Organicheskoi Khimii (1979), 15(11), pp. 2420–2421.*

Diss. Abstr. Int. B 1976, 37(2), 776.*

Patent Abstracts of Japan, vol. 011, No. 200, Jun. 27, 1987 & JP 62 020531 (Toray Silicone Co., Ltd.), Jan. 29, 1987.

* cited by examiner

*Primary Examiner*—Philip Tucker
*Assistant Examiner*—Marc S. Zimmer
(74) *Attorney, Agent, or Firm*—Burns, Doane, Swecker & Mathis, L.L.P.

(57) ABSTRACT

The invention concerns a method for preparing polyorganosiloxanes (POS) by (a) condensation polymerisation of monosilanes and/or acyclic siloxanes bearing reactive Si—OR units with R═H, or alkyl, or by (b) redistribution/condensation polymerisation of siloxane compounds based on cyclosiloxanes and/or acyclic siloxanes capable of bearing reactive Si—OR units such as defined above, Si—H or Si-alkenyl units, in the presence of an acid catalyst. Said method is characterised in that it consists in using at least a catalyst of the following formula (I) $(C_mF_{2m+1}SO_2)_nA$ wherein: m is an integer not less than 1; n is an integer equal to 1 or 2 and A represents OH, $NH_2$ or NH with: (i) n=1 and A=OH or (ii) n=1 and A=$NH_2$ or (iii) n=2 and A=NH; provided that, when said catalyst corresponds to formula (I) (i), it is brought in the presence of an inert support in mass amount QM, expressed in weight % relative to the total mass (a) of monosilanes and/or acyclic siloxanes or (b) of the initial siloxane compounds, which is not more than 1.5. The invention also concerns a catalyst for use in the preparation of POS by said process (a) or (b) consisting of at least a compound selected among the compound of formula I(ii), the compound of formula I(iii) and mixtures thereof.

9 Claims, No Drawings

METHOD FOR PREPARING POLYORGANOSILOXANES BY POLYMERIZATION CATALYZED BY A CATALYTIC SYSTEM BASED ON TRIFLIC ACID OR TRIFLIC ACID DERIVATIVES

The field of the invention is that of the preparation of silicones or polyorganosiloxanes, designated hereinafter POS. The preparation of silicones may be carried out in particular via ring-opening polymerization of cyclic oligosiloxanes (redistribution polymerization) or alternatively by polycondensation of silanol SiOH units carried by silanes, oligoorganosiloxanes or polyorganosiloxanes. The SiOH units involved in the polycondensation may be derived from the hydrolysis of alkoxy SiOR units with R=alkyl.

The polycondensation polymerization reactions which are of interest in the context of the invention are more particularly those which are catalyzed by acidic catalytic systems. Thus, according to another of its aspects, the invention also relates to acidic catalytic systems comprising triflic acid derivatives.

Many methods for producing polydiorgano-siloxane oils or gums, by heterogeneous or homogeneous, acid or base catalysis, from cyclic or acyclic oligomers called oligoorganosiloxanes (OOS) have been known for a long time (see the book by WALTER NOLL, Chemistry and Technology of silicons; Editions 1968 in English ACADEMIC PRESS, pages 209 to 218).

These methods lead to oils or gums which are in particular basic constituents of mono- or bicomponent polydiorganosiloxane compositions which cure into elastomers in the presence of an excessively large amount of catalyst, at high temperature or at room temperature.

The starting materials for these polymerizations may comprise: silanols $R_2Si(OH)_2$ or OOSs with silanol ends derived from the hydrolysis of chlorosilanes ($R_2SiCl_2$); hydroxylated silanes or hydroxylated OOSs derived from the hydrolysis of alkoxylated silanes or alkoxylated OOSs; polyorgano-siloxanes with silanol ends; or alternatively cyclosiloxanes which undergo ring opening, followed by redistribution and polymerization.

As regards cyclic monomers, anionic polymerization (base catalysis) has been widely used for the preparation of POS. Even if this anionic polymerization sometimes produces good yields, the cationic polymerization of cyclosiloxanes was found to be more advantageous and was unavoidable. Acid catalysis thus makes it possible to have reactions at room temperature. Furthermore, cationic polymerization may be carried out on cyclosiloxane monomers carrying functional groups, for example SiH or $SiCH_2Cl$, which are not compatible with the conditions of anionic methods.

In any case, the ring-opening polymerization of cyclosiloxanes using acidic catalytic systems is very common in laboratories and in industry. It is nevertheless the case that the mechanisms which govern this type of polymerization remain complex and are not always completely controlled.

The literature comprises many studies in which the starting materials or polymerization monomers are hexamethylcyclotrisiloxane (D3) or octamethylcyclo-tetrasiloxane (D4). These polymerizations are initiated by strong protonic acids such as $H_2SO_4$, $HClO_4$ or by LEWIS acids. Among the latter, trifluoromethane sulfonic acid (or triflic acid, represented by the abbreviation TFOH) has been widely studied.

Accordingly, American U.S. Pat. No. 2,961,245 describes the ring-opening mass polymerization of cyclotrisiloxane containing fluorinated hydrocarbon radicals, in the presence of perfluoroalkanesulfonic acid (for example TFOH or its derivatives), and of linear organosiloxanes with triorganosilyl ends (essentially hexamethyldisiloxane M2) which are used as chain-blocking agents. A fluorinated silicone oil is thus obtained, after devolatilization, whose viscosity is essentially determined by the $M2/D_3$ ratio. The catalyst is optionally removed by distillation or washing.

In a method for preparing polydiorgano-siloxanes containing silanol ends according to patent EP-B1-0 292 407, a polydimethylsiloxane oligomer with silanol ends, having a viscosity of 100 mPa.s at 25° C., is bulk polycondensed, under reduced pressure, at 110° C. and in the presence of TFOH. The water formed is removed and the addition polycondensation of a polysilazane such as hexamethylcyclotrisilazane is stopped. This product makes it possible to neutralize the effect of the TFOH catalyst.

British patent GB-A-1 325 654 teaches the polymerization, in the presence of a perfluoroalkane-sulfonic acid (for example TFOH) and silica, of cyclic polysiloxanes D3 and D4, optionally in the form of a mixture with chain-blocking linear diorganopoly-siloxanes of the M2 type. At the end of the reaction, the catalyst may be neutralized with hexamethyldisilazane.

European patent EP-B1-0 133 975 describes the polycondensation, in solvent medium, of linear or branched POSs having silanol functional groups, with a catalytic system comprising triflic acid derivatives.

More recently, catalytic systems based on derivatives of triflic acid or its homologs have been used in the polymerization of cyclosiloxane monomers. The triflic acid derivatives considered are more especially those containing fluorine substituents. By way of example of perfluoroalkanesulfonic acid or known derivative, there may be mentioned: $C_nF_{2n+1}SO_3H$, trimethylsilyl ester of triflic acid ($CF_3SO_3SiMe_3$: TMST), or benzyldimethylsilyl ester of triflic acid (BDMST), combined with a selective proton trap (for example triethylamine, tri-N-butylamine, pyridine) or alternatively a quaternary ammonium salt of triflic acid such as $Bu_4N^+CF_3SO_3^-$. The documents JP-A-03/292 329, JP-A-01/000 125, JP-A-62/050 531 and U.S. Pat. No. 4,929, 691 relate to catalysts of the $C_nF_{2n+1}SO_3H$ type.

U.S. Pat. No. 5,696,219 relates to a method for preparing polysiloxanes from cyclosiloxanes, functionalized with fluoroalkyl groups, according to a ring-opening polymerization in the absence of acidic catalytic systems. In this case, the catalytic system comprises silyl esters of triflic acid and, in particular, trimethylsilyl ester of triflic acid $CF_3SO_3SiMe_3$ combined with a LEWIS base, acting as proton trap, 2,6-di-tert-butylpyridine. Without this amine-containing base, the polymerization does not take place. This amine-containing base may be replaced by a triflic acid salt such as tetrabutylammonium triflate.

European application EP-A-0 854 162 and Japanese application JP-A-04/268 333 also relate to the use of trimethylsilyl ester of triflic acid or TMST in the polymerization of cyclosiloxanes.

KAZMIERSKI et al. describe, in Am. Chem. Soc., Div. Poly. Chem., (1998) 439, the use of the silyl ester TMST combined with TFOH for the polymerization of 1,1-diphenyl-3,3,5,5-tetramethyl-cyclotrisiloxane.

In reality, as teaches the article by G. TOSKAS et al. in Macromol. Chem. Phys., 196 (1995) 2715, the role of TMST or of triflic anhydride in the polymerization reactions of cyclosiloxanes is not that of a catalyst but rather that of an inhibitor of parasitic cyclization reaction and of bonding between polymer chains.

The publication by A. TREHAN et al. in TETRAHEDRON LETTERS, Vol. 34, No. 45, pages 7335–7338, 1993 describes a novel catalyst for reactions between acetals and silylated nucleophiles. This novel catalyst is trimethylsilylbis(fluorosulfonyl)imide.

In such a state of the art, one of the essential objectives of the present invention is to significantly improve the homogeneous or heterogeneous catalysis of the industrial polymerization reactions by polycondensation of silanes or of polysiloxanes having SiOH units, as well as by ring-opening polymerization of cyclosiloxanes, for example, of the D3 or D4 type.

The improvement aimed at is an improvement in terms of control, reliability and productivity of industrial methods of production of linear POSs.

Another objective aimed at through the improvement of the catalytic system is to render perfect the quality of the POS products obtained, to optimize safety and to minimize the eco-toxic impacts of the industrial processes.

Another essential objective of the invention is to provide the catalytic system which makes it possible to give the abovementioned method the specifications set out above.

Having set all these objectives among others, the Applicant has had the merit to isolate, from the family of acid catalysts comprising triflic acid and its derivatives, a novel catalyst which is completely innovative and efficient.

Accordingly, the present invention relates, first of all, to a method for preparing polyorgano-siloxanes (POS) by (a) polycondensation of monosilanes and/or of acyclic siloxanes carrying reactive Si—OR units with R=H or alkyl, or by (b) redistribution/polycondensation of siloxane compounds based on cyclosiloxanes and/or acyclic siloxanes which may carry reactive Si—OR units as defined above, Si—H units or Si-alkenyl units, in the presence of an acid catalyst, said method being characterized in that there is used at least one catalyst of the following formula (I):

$$(C_mF_{2m+1}SO_2)_nA \quad (I)$$

in which:

m is an integer greater than or equal to 1, preferably $1 \leq m \leq 100$, still more preferably $1 \leq m \leq 10$ and most especially m=1;

n is an integer equal to 1 or 2 and A represents OH, $NH_2$ or NH with:
(i) n=1 and A=OH or
(ii) n=1 and $A=NH_2$ or
(iii) n=2 and A=NH;

with the proviso according to which, when this catalyst corresponds to the formula I(i), it is supported on an inert material, preferably carbon black, in a quantity by mass QM expressed as % by weight relative to the total mass (a) of the monosilanes and/or acyclic siloxanes or (b) of the starting siloxane compounds:
$QM \leq 1.5$,
preferably $QM \leq 1$,
more preferably $0.01 \leq QM \leq 1$.

This particular group of catalysts of formula (I) makes it possible to obtain, with a high kinetic, polydiorganosiloxanes and in particular polydimethyl-siloxanes having desired degrees of polymerization.

The polymerizations carried out with the triflic acid derivatives of formula (I) are, in equal concentrations and under the same conditions as a conventional catalysis with triflic acid, markedly quicker while leading to POSs of higher viscosity (molecular mass) and having a residual volatile level which is at least equal.

In accordance with the invention, the starting materials ("monomers") are advantageously chosen from the group comprising:

the silanols of formula (II): $R^1R^2Si(OH)_2$, the hydroxylated linear oligo- or polyorganosiloxanes (OPOS-1) of formula (III): $HO(R^3R^4SiO)_xH$, the cycloorganosiloxanes (COS) of formula (IV): $(R^5R^6SiO)_y$, the nonhydroxylated linear oligo- or polyorganosiloxanes (OPOS-2) of formula (V):

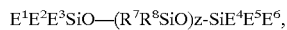

$E^1E^2E^3SiO—(R^7R^8SiO)z-SiE^4E^5E^6$, and mixtures thereof
with the following additional features:
the radicals $R^1$ to $R^4$, $R^7$ and $R^8$ and $E^1$ to $E^6$ in the formulae (II), (III), (V) above are mutually identical or different and are chosen from the following radicals: hydrogen, $C_1$–$C_{30}$ (preferably $C_1$–$C_{10}$) alkyls, $C_2$–$C_{30}$ (preferably $C_2$–$C_{10}$) alkenyls, and aryls which are optionally substituted—advantageously with halogens—; methyl, ethyl, propyl, phenyl, vinyl, allyl and 3,3,3-trifluoropropyl radicals being particularly preferred, the radicals $R^5$ and $R^6$ in formula (IV) above are mutually identical or different and have the same meaning as indicated in the context of the radicals $R^1$ to $R^4$, $R^7$, $R^8$ and $E^1$ to $E^6$, or further represent a group $OR^9$ where $R^9$ is a hydrogen atom or a $C_1$–$C_5$ alkyl (methyl, ethyl and propyl radicals being preferred), the various symbols x, y and z which appear in the formulae (III), (IV) and (V) are integers or fractions which vary in the following ranges:
OPOS-1 (III): x=from 2 to 1,000, preferably from 2 to 500, and even better from 2 to 100,
COS (IV): y=from 3 to 12, preferably from 3 to 8, and even better from 3 to 5,
OPOS-2 (V): z=from 2 to 1,000, preferably from 2 to 500, and even better from 2 to 100.

The silanols of formula (II) are for example products of hydrolysis of chlorosilanes derived from direct synthesis. These silanols of formula (II), just like the OPOS-1 of formula (III), may also be derived from the hydrolysis of alkoxylated precursors carrying SiOR units with R=alkyl.

The cycloorganosiloxanes COS of formula (IV) are for example products of the D3 or D4 type which react according to a ring-opening (redistribution) and polycondensation mechanism.

According to a preferred characteristic of the invention, there is selected as starting materials a mixture:
of several COSs (IV) with each other, or
of at least one COS (IV) with at least one OPOS-1 (III) and/or with at least one OPOS-2 (V),
in which mixture the siloxane compounds used possess formulae where the symbols $R^3$ to $R^8$ and $E^1$ to $E^6$ are chosen from the group formed by a hydrogen atom, a methyl radical or a vinyl radical.

According to a more preferred characteristic, the following mixtures:
of octamethyltetracyclosiloxane (D4) and of hexamethyldisiloxane (M2),
of hydrogen methyltetracyclosiloxane (D'4) and of dihydrogen tetramethyldisiloxane (M2')
of D4 and of D'4
of vinylmethyltetracyclosiloxane (D4$^{Vi}$) and of divinyltetramethyldisiloxane (M2$^{Vi}$)
of α, ω-dihydroxylated polydimethylsiloxane and of D4, such a mixture being known in hydrolysates (Silox) of chlorosilanes,
of Silox and of M2
of D4 and of M'2
of D4, of M2 and of polymethylhydrogen siloxane with trimethylsilyl ends are most especially selected.

The Siloxes are mixtures of α,ω-dihydroxylated oligo- or polyorganosiloxane and of cyclosiloxanes. These mixtures are derived from the direct synthesis of organochlorosilanes (ROCHOW synthesis) and from the hydrolysis of the chlorosilanes obtained.

The fact that there is interest in triflic acid derivatives in order to use them as industrial catalyst for polymerization of silicones can be compared with an inventive step against an unfavorable prejudice weighing over triflic acid, in particular because of the known difficulty for neutralizing this acid (very unstable TFOH salt) and its corrosive nature.

According to a first embodiment corresponding to heterogeneous catalysis with a catalyst (I) corresponding to formula I(i): $C_mF_{2m+1}SO_3H$, a catalyst (I) which is supported on an inert material, preferably carbon black, is used. The polymerization is optionally stopped by adding an agent neutralizing the acid I(i) and the support comprising the catalyst I(i) is then removed from the reaction medium. The preparation of the catalyst supported on an inert material is generally carried out by simply adding the catalyst (I) to the chosen support, it being possible for this operation to be performed beforehand or alternatively at the time of preparing the polymerization reaction medium.

The polymerizations carried out with this triflic acid I(i), preferably supported on carbon black, are advantageous in that they lead to a medium which is easier to neutralize at the end of polymerization. Indeed, compared with homogeneous phase catalysis, the residual acidity is markedly less and it is possible to thus obtain silicone oils having better temperature and storage stability.

Moreover, this system allows, all conditions being the same in other respects, markedly faster polymerization kinetics than those obtained for heterogeneous catalyses on acidic earth, while leading to products with similar characteristics from the point of view of viscosity and level of volatile substances.

Furthermore, polymerization according to this first embodiment is possible at temperatures ranging from room temperature (23° C.) to 150° C. or even more.

According to a second embodiment corresponding to heterogeneous catalysis, a catalyst (I) or a mixture of catalysts (I) corresponding to the formula(e) I(ii) $(C_mF_{2m+1}SO_2)NH_2$ and/or I(iii): $(C_mF_{2m+1}SO_2)_2NH$ and supported on an inert material, preferably carbon black, is used. The polymerization is then optionally stopped by adding an agent neutralizing the supported catalyst(s) I(ii) and/or I(iii), and the support comprising the catalyst(s) I(ii) and/or I(iii) is finally removed from the reaction medium.

According to a third embodiment corresponding to homogeneous phase catalysis, there is used a catalyst (I) or a mixture of catalysts (I) corresponding to the formula(e) I(ii) and/or I(iii) in liquid form which is mixed with the reaction medium comprising the starting materials and the polymerization is stopped by adding an agent neutralizing the catalyst(s) (I) and the reaction medium is optionally filtered in order to remove the solid residues.

This homogeneous catalysis with trifluoromethanesulfonimide (TFSI) allows rapid polymerization, in particular compared with a heterogeneous catalysis on acidic earth, all conditions being the same in other respects and for final products with similar characteristics.

In addition, this polymerization catalyzed with the TFSI is possible at temperatures ranging from room temperature (23° C.) to 150° C. or even more.

It is thus evident that the catalyst according to the invention is either of the heterogeneous type when it is TFOH, or of the heterogeneous or homogeneous type when it is TFSI.

According to a preferred embodiment of the invention, the concentration of catalyst (CC) is adjusted to the following values (molar concentration in ‰ relative to the total quantity of starting silicon-containing materials.

wide range of variation of CC: $0.1 \leq CC \leq 10$, preferably: $1 \leq CC \leq 8$, and still more preferably: $3 \leq CC \leq 5$.

It is highly preferable, for the polymerization to occur correctly, that the reaction atmosphere is free of moisture. Thus, work is advantageously carried out under an atmosphere of neutral gas, for example argon or nitrogen.

The reaction pressure is advantageously normal and the temperature may range from room temperature (23° C.) to a temperature of 150° C. or more.

The polymerization is stopped by deactivating the catalyst. If it is an acid catalyst, the deactivation may be carried out using a basic neutralizing agent. As compound of this type, there may be mentioned for example: sodium carbonate ($Na_2CO_3$) and sodium bicarbonate ($NaHCO_3$).

The neutralization is all the more necessary in the case of homogeneous catalysis since in such a case, unlike heterogeneous catalysis, the catalyst is not removed at the end of the reaction.

Advantageously, the fluorinated chain $C_mF_{2m+1}$ may be extended so as to increase the acidity of the catalyst and subsequently its efficiency.

In the preceding text, it is explained that the catalyst according to the invention, in the case of heterogeneous catalysis, is supported on an inert material, preferably carbon black. There will be no departure from the scope of the present invention on carrying out, in order to obtain this supported catalyst, grafting of the catalytic functional groups of the compounds (I) of the TFOH or TFSI type onto supports, for example of the type including polymer resins, clay, silica or any other solid support which is stable and inert under the conditions of the present invention.

According to another of these aspects, the present invention relates to a catalyst which is useful for preparing polyorganosiloxanes (POS) by (a) polycondensation of (mono)silanes and/or of acyclic siloxanes carrying reactive Si—OR units with R=H or alkyl, or by (b) redistribution/polycondensation of siloxane compounds based on cyclosiloxanes and/or acyclic siloxanes which may carry reactive Si—OR units as defined above, Si—H units or Si-alkenyl units, in the presence of an acid catalyst, said method being characterized in that it comprises at least one compound chosen from the compounds of the following formulae:

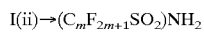

and mixtures thereof.

The catalyst TFSI according to the invention I(ii) and I(iii) is markedly more efficient than a conventional catalyst of the $H_2SO_4$ or TFOH type in terms of reaction kinetics. In addition, compared to TFOH, it makes it possible to obtain POSs of higher viscosity (molecular mass) with a lower level of residual volatile substances, under the same qualitative and quantitative conditions. Moreover, TFSI is stable and easy to handle.

The examples which follow will make it possible to better understand the method and the catalyst according to the invention by revealing all their advantages and the possible variant embodiments.

The starting materials chosen without limitation in these examples are octamethylcyclo-siloxane (D4) and a chain blocker consisting of hexamethyldisiloxane (M2).

EXAMPLES

Examples 1 to 4

Polymerization of D4 and M2 for synthesizing an α,ω-bis(trimethylsilyl)polydimethyl-siloxane siloxane (PDMS) oil in the presence of a control catalytic system consisting of TFOH or of a catalytic system according to the invention based on TFSI I(iii)

A—Procedure:

D4 and M2 (molar purity>99.9% by gas chromatography) are dried beforehand for 24 h over magnesium sulfate. They are then enclosed under an argon vacuum, degassed several times, and then dried over a 4 Å molecular sieve. The catalysts TFOH (RHODIA product of molar purity>99%) and TFSI $(CF_3SO_2)_2NH$ (SIGMA product at 97% molar purity) are kept under argon in sealed containers and in a refrigerator. They are then introduced, under an argon atmosphere, into a glove box and then used directly.

A 250 ml three-necked flask, placed beforehand under vacuum, and then placed under argon, equipped with magnetic stirring, with a heating system and with a septum for collecting samples of reaction mass and injecting the catalyst, and with a system allowing circulation of argon, is introduced into a glove box and under an argon atmosphere.

100 g of D4 and 1.35 g of M2 are introduced into the flask at 25° C. The polymerization is initiated (t=0 h) by adding the catalyst to the monomer and to the blocker using a syringe at 25° C. at a concentration of 4‰ relative to D4+M2 (molar). The reaction mixture is continuously stirred. The polymerization is then either performed at 25° C. or the temperature is gradually increased up to 100° C. (rise over 10 min) for a period of 5 h. The polymerization is monitored over time by measuring the viscosity of the corresponding nondevolatilized oil on successive samples (10 ml) (at 0.5, 3 and 5 h of reaction).

The polymerization reaction is stopped by the addition of an excess of sodium bicarbonate (0.126 g–1.5 mmol). The mixture is then directly filtered on neutral earth (clarcel) or, for the samples for analysis, also after neutralization (neutralizing agent: 0.0126 g–0.15 mmol), on a 0.45 μm Millipore filter in order to remove the solid residues. A transparent and clear oil is obtained for which the viscosity and the level of volatile substances are immediately measured in a Chopin oven (1 g of oil at 150° C./2 h). An acidity level is also measured and it is less than 2 mg/kg HCl equivalent.

B—Experimental Conditions and Results:

The type and mass of catalyst, the polymerization temperature (25 or 100° C.) and the results obtained in terms of viscosity of the synthesized oils before devolatilization and in terms of percentage by mass of volatile substances are presented in table 1 below.

TABLE 1

Polymerization of the D4 and M2 mixture and synthesis of the α,ω-bis(trimethylsilyl)polydimethyl-siloxane oil catalyzed by TFOH (controls) and TFSI = I(iii).

| | Examples | | | |
|---|---|---|---|---|
| | 1 | 2 | 3 | 4 |
| Catalyst | TFOH | TFOH | TFSI | TFSI |
| M cata. (g)[1] | 0.203 | 0.203 | 0.380 | 0.380 |
| $T_{polymerization}$ (° C.) | 25 | 100 | 25 | 100 |
| $V25_{½h}$[2] | 211 | 222 | 258 | 291 |
| $V25_{1h}$[2] | 268 | 255 | 295 | 298 |
| $V25_{3h}$[2] | 290 | 265 | 298 | 306 |
| $V25_{5h}$[2] | 300 | 285 | 304 | 308 |
| GPC[3] | | | | |
| Mn | 13360 | 11740 | 11570 | 11460 |
| Mw | 24310 | 23360 | 22810 | 22790 |
| Ip | 1.82 | 2 | 2 | 2 |
| Yield[4] (%) | 88.4 | 87.8 | 91.9 | 91.9 |
| V25 (PDMS final)[4] | 449 | 441 | 467 | 458 |
| GPC (PDMS final)[4] | | | | |
| Mn | 12310 | 12900 | 11275 | 12455 |
| Mw | 24835 | 24720 | 24150 | 23935 |
| Ip | 2 | 1.9 | 2.15 | 1.9 |
| $DPn^{4-5)}$ | | | | |
| by GPC | 164 | 172 | 154 | 153 |
| by $^{29}Si$ NMR | 144 | 165 | 165 | 165 |
| by ethoxylation | 149 | 149 | 138 | 135 |
| → ~ M[6] | 11188 | 11188 | 10374 | 10152 |

[1]0.0013 mol (4 mol % relative to D4 + M2)
[2]Viscosity (in mPa · s) at 25° C. after x hours (x h) of reaction time for the PDMS obtained before devolatilization
[3]Analysis of the PDMS by steric exclusion chromatography or GPC ("Gel Permeation Chromatography") before devolatilization (without removing the low-molecular-weight compounds)
[4]Analysis of the PDMS after devolatilization (that is to say after removing the low-molecular-weight compounds)
[5]Theoretical degree of polymerization DPn = 4[D4]/[M2] = 162
[6]M (actual mass of the PDMS having the structure: $Me_3SiO$—$(Me_2SiO)_{DPn}$—$SiMe_3$ and calculated from the DPn after ethoxylation. Mw and Mn are given as polystyrene standard equivalents.

Examples 5 to 8

Polymerization of D4 and M2 in order to synthesize α,ω-bis(trimethylsilyl)polydimethyl-siloxane oil using a homogeneous catalytic system based on triflic acid alone (control) or using a heterogeneous catalytic system consisting of triflic acid TFOH supported on carbon black (CB).

A—Procedure:

D4 and M2 (molar purity>99.9% by gas chromatography) are dried beforehand for 24 h over magnesium sulfate. They are then enclosed under an argon vacuum, degassed several times, and then dried over a 4 Å molecular sieve. The catalyst TFOH (RHODIA product of molar purity>99%) is kept under argon in sealed containers and in a refrigerator. The carbon black is a CECA product (type 4S). They are then introduced, under an argon atmosphere, into a glove box and then used directly.

A 250 ml three-necked flask, placed beforehand under vacuum, and then placed under argon, equipped with magnetic stirring, with a heating system and with a septum for collecting samples of reaction mass and injecting the catalyst, and with a system allowing circulation of argon, is introduced into a glove box and under an argon atmosphere.

100 g of D4 and 1.35 g of M2 are introduced into the flask at 25° C. In the case of the TFOH/CB catalytic system, carbon black (0.26 g) is also introduced. The polymerization is initiated (t=0 h) by adding the catalyst to the monomer and to the blocker using a syringe at 25° C. at a concentration of 49‰ relative to D4+M2 (molar). The reaction mixture is continuously stirred. The polymerization is then either performed at 25° C. or the temperature is gradually increased up to 100° C. (rise over 10 min) for a period of 5 h. The polymerization is monitored over time by measuring the viscosity of the corresponding nondevolatilized oil on successive samples (10 ml) (at 0.5, 3 and 5 h of reaction).

The polymerization reaction is stopped by the addition of an excess of sodium bicarbonate (0.126 g–1.5 mmol). The mixture is then directly filtered on neutral earth (clarcel) or, for the samples for analysis, also after neutralization (neutralizing agent: 0.0126 g–0.15 mmol), on a 0.45 μm Millipore filter in order to remove the solid residues. A transparent and clear oil is obtained for which the viscosity and the level of volatile substances are immediately measured in a Chopin oven (1 g of oil at 150° C./2 h).

B—Experimental Conditions and Results:

Table 2 below gives the type and mass of catalyst, the polymerization temperature, 25 or 100° C., as well as the results in terms of viscosity of the oils obtained before devolatilization and in terms of percentage by mass of the volatile substances.

TABLE 2

Polymerization of D4 and M2 and synthesis of α,ω-bis (trimethylsilyl)polydimethylsiloxane oil catalyzed by TFOH alone (control) or supported on carbon black (CB)

| | Example 5 | Example 6 | Example 7 | Example 8 |
|---|---|---|---|---|
| Catalyst | TFOH alone | TFOH alone | TFOH/CB | TFOH/CB |
| M cata. (g) | 0.203 | 0.203 | 0.203 | 0.203 |
| $T_{polymerization}$ (° C.) | 25 | 100 | 25 | 100 |
| $V25_{½h}$ (mPa · s)* | 290 | 255 | 253 | 284 |
| $V25_{3h}$ (mPa · s)* | 290 | 265 | 299 | 293 |
| $V25_{5h}$ (mPa · s)* | 300 | 285 | 303 | 295 |
| Acidity** | 220 | 250 | 3 | 3 |
| Volatiles at 5 h (% mass) | 11.40 | 11.40 | 10.93 | 10.88 |

*Viscosity measured at 25° C. after x hours (x h) of polymerization on a nondevolatilized oil.
**Acidity expressed in mg/kg of HCl equivalents. It is measured after adding the neutralizing agent.

Comparative Examples 9 to 12

Polymerization of D4 and M2 in order to synthesize α,ω-bis(trimethylsilyl)poly-dimethylsiloxane oil using a heterogeneous catalytic system consisting of acidic earth (tonsil)

A—Procedure:

The procedure used for a Tonsil-based catalysis (product TONSIL® OPTIMUM 210 FF from Süd-Chemie) is identical overall to that of the preceding examples (apparatus, loads, temperature, polymerization, sample collections, filtration, analyses). The only differences relate to:

the introduction of the catalyst without using a syringe.

the neutralization which is unnecessary: the final filtration is sufficient to remove the catalyst without residual traces of acidity in the medium (level of acidity<3 mg/kg of HCl equivalent).

B—Experimental Conditions and Results:

Table 3 below gives the type and the mass of catalyst, polymerization temperature (25° or 100° C.), and the results in terms of viscosity of the oils obtained before devolatilization and in terms of percentage by mass of volatile substances.

TABLE 3

Polymerization of D4 and M2 and synthesis of α,ω-bis (trimethylsilyl)polydimethylsiloxane oil catalyzed by Tonsil

| | Example 13 | Example 14 | Example 15 | Example 16 |
|---|---|---|---|---|
| M cata. (g) | 0.25 | 0.25 | 1 | 1 |
| $T_{polymerization}$ (° C.) | 25 | 100 | 25 | 100 |
| $V25_{½h}$ (mPa · s)* | 2.3 | 6.5 | 2.3 | 46 |
| $V25_{3h}$ (mPa · s)* | 2.3 | 242 | 2.4 | 239 |
| $V25_{5h}$ (mPa · s)* | 2.3 | 254 | 2.5 | 247 |
| Acidity** | 2 | 3 | 2 | 2 |
| Volatiles at 5 h (% mass) | 99.15 | 12.10 | 97.50 | 12.10 |

*Viscosity measured at 25° C. after x hours (x h) of polymerization on a nondevolatilized oil.
**Acidity expressed in mg/kg of HCl equivalents. It is measured after adding the neutralizing agent.

Similar polymerizations at 25° C. to 100° C., carried out with 0.5 g of Tonsil, confirm these results.

What is claimed is:

1. A method for preparing polyorganosiloxanes (POS) by (a) polycondensation of monosilanes and/or of acyclic siloxanes carrying reactive Si—OR units with R=H or alkyl, or by (b) redistribution/polycondensation of siloxane compounds based on cyclosiloxanes and optionally acyclic siloxanes which may carry reactive Si—OR units as defined above, Si—H units or Si-alkenyl units, in the presence of an acid catalyst, said method using at least one catalyst of the following formula (I):

$$(C_mF_{2m+1}SO_2)_nA \tag{I}$$

in which:

△ m is an integer greater than or equal to 1;

△ n is an integer equal to 1 or 2 and A represents OH, NH$_2$ or NH with:
 (i) n=1 and A=OH or
 (ii) n=1 and A=NH$_2$ or
 (iii) n=2 and A=NH;

△ with the proviso according to which: ○ when this catalyst corresponds to the formula I(i), it is supported on an inert material, in a quantity by mass QM expressed as % by weight relative to the total mass (a) of the monosilanes and/or acyclic siloxanes or (b) of the starting siloxane compounds, which is equal to or less than 1.5; and ○ when this catalyst corresponds to formula I(iii): either it is supported on an inert material in the case of the preparation of polyorganosiloxanes (POS) by (a) polycondensation of monosilanes and/or acyclic siloxanes or by (b) redistribution/polycondensation of siloxane compounds based on cyclosiloxanes and optionally acyclic siloxanes.

2. The method as claimed in claim 1, wherein the starting materials are selected from the group comprising:

the silanols of formula (II): R$^1$ R$^2$Si (OH)$_2$, the hydroxylated linear oligo- or polyorganosiloxanes (OPOS-1) of formula (III): HO (R$^3$R$^4$SiO)$_x$H, the cyclooroganosiloxanes (COS) of formula (IV): R$^5$R$^6$SiO)$_y$, the nonhydroxylated linear oligo- or polyorganosiloxanes (OPOS-2) of formula (V):

$$E^1E^2E^3 \text{ SiO}—(R^7R^8\text{SiO})z\text{-SiE}^4E^5E^6,$$

and mixtures thereof
with the following additional features:
  the radicals $R^1$ to $R^4$, $R^7$ and $R^8$ and, $E^1$ to $E^6$ in the formulae (II), (III), (V) above are mutually identical or different and are selected from the group consisting of the following radicals: hydrogen, $C_1$–$C_{30}$ alkyls, $C_2$–$C_{30}$ alkenyls, and aryls which are optionally substituted,
  the radicals $R^5$ and $R^6$ in formula (IV) above are mutually identical or different and have the same meaning as indicated in the context of the radicals $R^1$ to $R^4$, $R^7$, $R^8$ and $E^1$ to $E^6$, or further represent a group $OR^9$ where $R^9$ is a hydrogen atom or a $C_1$–$C_5$ alkyl,
  the various symbols x, y and z which appear in the formulae (III), (IV) and (V) are integers or fractions which vary in the following ranges:
  OPOS-1 (III): x=from 2 to 1 000,
  COS (IV): y=from 3 to 12,
  OPOS-2 (V): z=from 2 to 1,000.

3. The method as claimed in claim 2, comprising as starting materials a mixture:
  of several COSs (IV) with each other, or
  of at least one COS (IV) with at least one OPOS-1 (III) and/or with at least one OPOS-2 (V),
  in which mixture the siloxane compounds used possess formulae where the symbols $R^3$ to $R^8$ and $E^1$ to $E^6$ are selected from the group formed by a hydrogen atom, a methyl radical or a vinyl radical.

4. The method as claimed in claim 1, having the following points:
  the catalyst (I) which corresponds to the formula I (i): $C_mF_{2m+1}SO_3H$ is supported on an inert material,
  the polymerization is optionally stopped by adding an agent neutralizing the supported acid I(i),
  the support comprising the catalyst I(i) is then removed from the reaction medium.

5. The method as claimed in claim 1, having the following points:
  the catalyst (I) or the mixture of catalyst (I) corresponding to the formula(e) (I)(ii) $(C_mF_{2m+1}SO_2)NH_2$ and/or (I)(iii) $(C_mF_{2m+1}SO_2)_2NH$ and is supported on an inert material,
  the polymerization is optionally stopped by adding an agent neutralizing the supported catalysts I(ii) and/or I(iii),
  the support comprising the catalysts I(ii) and/or I(iii) is removed from the reaction medium.

6. The method as claimed in claim 1, having the following points:
  there is used a catalyst (I) or the mixture of catalysts (I) corresponding to the formula(e) I(ii) and/or I(iii) in liquid form which is mixed with the reaction medium comprising the starting materials,
  the polymerization is stopped by adding an agent neutralizing the catalyst(s) (I) and the reaction medium is optionally filtered in order to remove the solid residues.

7. The method as claimed in claim 1, wherein the concentration of catalyst (CC) is adjusted to the following values (molar concentration in % relative to the total quantity of starting silicon-containing product(s): $0.1 \leq CC \leq 10$.

8. The method as claimed in claim 4, wherein the polymerization is carried out at a temperature ranging from room temperature (23° C.) to a temperature of 150° C.

9. The method as claimed in claim 4, wherein at least one compound based on sodium carbonate and/or sodium bicarbonate is selected as a neutralizing agent.

* * * * *